(12) United States Patent
Egashira et al.

(10) Patent No.: US 9,976,206 B2
(45) Date of Patent: May 22, 2018

(54) ROLLED ROUND STEEL MATERIAL FOR STEERING RACK BAR, AND STEERING RACK BAR

(71) Applicant: NIPPON STEEL & SUMITOMO METAL CORPORATION, Tokyo (JP)

(72) Inventors: Makoto Egashira, Tokyo (JP); Sadanori Horikami, Tokyo (JP); Masashi Higashida, Tokyo (JP); Takahiro Okada, Tokyo (JP); Yutaka Neishi, Tokyo (JP); Tatsuya Hasegawa, Tokyo (JP); Hitoshi Matsumoto, Tokyo (JP)

(73) Assignee: NIPPON STEEL & SUMITOMO METAL CORPORATION, Tokyo (JP)

( * ) Notice: Subject to any disclaimer, the term of this patent is extended or adjusted under 35 U.S.C. 154(b) by 271 days.

(21) Appl. No.: 14/911,804

(22) PCT Filed: Jun. 18, 2014

(86) PCT No.: PCT/JP2014/066200
§ 371 (c)(1),
(2) Date: Feb. 12, 2016

(87) PCT Pub. No.: WO2015/029553
PCT Pub. Date: Mar. 5, 2015

(65) Prior Publication Data
US 2016/0186300 A1   Jun. 30, 2016

(30) Foreign Application Priority Data
Aug. 26, 2013 (JP) ................................. 2013-174064

(51) Int. Cl.
C22C 38/28      (2006.01)
C22C 38/50      (2006.01)
(Continued)

(52) U.S. Cl.
CPC ................ $C22C\ 38/60$ (2013.01); $B21B\ 1/16$ (2013.01); $B21B\ 3/02$ (2013.01); $B62D\ 3/12$ (2013.01);
(Continued)

(58) Field of Classification Search
None
See application file for complete search history.

(56) References Cited

U.S. PATENT DOCUMENTS 9,840,759 B2 * 12/2017 Horikami ................ C22C 38/60

FOREIGN PATENT DOCUMENTS

CN    1701127       11/2005
CN    1791696       6/2006
(Continued)

Primary Examiner — Deborah Yee
(74) Attorney, Agent, or Firm — Clark & Brody

(57) ABSTRACT

A rolled round steel material contains C: 0.38 to 0.55%, Si: 1.0% or less, Mn: 0.20 to 2.0%, S: 0.005 to 0.10%, Cr: 0.01 to 2.0%, Al: 0.003 to 0.10%, B: 0.0005 to 0.0030%, Ti: 0.047% or less, Cu: 0 to 1.0%, Ni: 0 to 3.0%, Mo: 0 to 0.50%, Nb: 0 to 0.10%, V: 0 to 0.30%, Ca: 0 to 0.005%, and Pb: 0 to 0.30%, a remaining portion being constituted by Fe and an impurities, the impurities containing P in an amount of 0.030% or less and N in an amount of 0.008% or less, and has a chemical composition satisfying [3.4N≤Ti≤3.4N+0.02]. The microstructure is constituted by ferrite (F), lamellar pearlite (LP), and cementite (C) and microstructural features vary in terms of the lateral, longitudinal and central portions of the steel. This steel material has a high base material toughness and good machinability without performing thermal refining.

8 Claims, 2 Drawing Sheets

(51) Int. Cl.

| | | |
|---|---|---|
| *C22C 38/32* | (2006.01) | |
| *C22C 38/42* | (2006.01) | |
| *C22C 38/44* | (2006.01) | |
| *C22C 38/46* | (2006.01) | |
| *C22C 38/48* | (2006.01) | |
| *B21B 1/16* | (2006.01) | |
| *F16H 55/26* | (2006.01) | |
| *B62D 3/12* | (2006.01) | |
| *C22C 38/60* | (2006.01) | |
| *C22C 38/00* | (2006.01) | |
| *C22C 38/38* | (2006.01) | |
| *C22C 38/58* | (2006.01) | |
| *C21D 9/00* | (2006.01) | |
| *C21D 9/28* | (2006.01) | |
| *B21B 3/02* | (2006.01) | |
| *C22C 38/02* | (2006.01) | |
| *C22C 38/04* | (2006.01) | |
| *C22C 38/06* | (2006.01) | |
| *C22C 38/20* | (2006.01) | |
| *C22C 38/22* | (2006.01) | |
| *C22C 38/24* | (2006.01) | |
| *C22C 38/26* | (2006.01) | |
| *C22C 38/54* | (2006.01) | |
| *C21D 8/06* | (2006.01) | |

(52) U.S. Cl.
CPC ............. *C21D 9/0075* (2013.01); *C21D 9/28* (2013.01); *C22C 38/00* (2013.01); *C22C 38/001* (2013.01); *C22C 38/002* (2013.01); *C22C 38/02* (2013.01); *C22C 38/04* (2013.01); *C22C 38/06* (2013.01); *C22C 38/20* (2013.01); *C22C 38/22* (2013.01); *C22C 38/24* (2013.01); *C22C 38/26* (2013.01); *C22C 38/28* (2013.01); *C22C 38/32* (2013.01); *C22C 38/38* (2013.01); *C22C 38/50* (2013.01); *C22C 38/54* (2013.01); *C22C 38/58* (2013.01); *C21D 8/06* (2013.01); *C21D 2211/003* (2013.01); *C21D 2211/005* (2013.01); *C21D 2211/009* (2013.01)

(56) References Cited

FOREIGN PATENT DOCUMENTS

| | | |
|---|---|---|
| CN | 104011249 | 8/2014 |
| JP | 2010-168624 | 8/2010 |
| JP | 2011-214130 | 10/2011 |
| JP | 2011-241466 | 12/2011 |
| JP | 2011-241468 | 12/2011 |
| JP | 2013-147728 | 8/2013 |
| KR | 10-2005-0050137 | 5/2005 |

\* cited by examiner (a)

(b)

(c)

ROLLED ROUND STEEL MATERIAL FOR STEERING RACK BAR, AND STEERING RACK BAR

TECHNICAL FIELD

The present invention relates to a rolled round steel material for a steering rack bar, and a steering rack bar.

BACKGROUND ART

Among automobile components, a steering rack bar (also simply referred to as "rack bar" hereinafter) used in a steering device is an important component serving as a backbone that changes the traveling direction of a car and connects right and left wheels, and if this steering rack bar is damaged, a steering wheel cannot be operated. Thus, a steel material used for a rack bar needs to be very reliable.

It should be noted that a rack bar has been conventionally manufactured by performing thermal refining, namely hardening and tempering, performing drawing processing as required thereafter, and performing punching and gear cutting through cutting processing on a round steel material obtained by rolling a medium-carbon steel material, and then performing induction hardening and tempering on the tooth-shaped portions. It should be noted that the rolled round steel material means a steel material whose cross-section is processed into a circular shape by rolling, and gear cutting means forming tooth-shaped portions.

In addition, it is required that a rack bar that has undergone the induction hardening does not break due to a crack in an induction hardening layer developing in a base material, even when an excessive load is applied thereto.

Furthermore, deep hole drilling is performed on the rack bar in the lengthwise direction of a central portion in the diameter direction.

Therefore, a round steel material used as the raw material for a rack bar needs to have good machinability and excellent base material impact properties (base material toughness) that resist crack development.

Inventors of the present invention proposed the following steel material, for example, as a steel material used in such a steering rack bar.

Patent Document 1 discloses a rolled steel material for induction hardening that contains, in mass %, C in an amount of 0.38 to 0.55%, Si in an amount of 1.0% or less, Mn in an amount of 0.20 to 2.0%, P in an amount of 0.020% or less, S in an amount of 0.10% or less, Cr in an amount of 0.10 to 2.0%, Al in an amount of 0.10% or less, N in an amount of 0.004 to 0.03%, the remaining portion being constituted by Fe and impurities, and has a chemical component in which the value of in 1 expressed by the equation [fn 1=C+(1/10)Si+(1/5)Mn+(5/22)Cr+1.65V−(5/7)S] (where C, Si, Mn, Cr, V, and S in the equation respectively express the amounts of the elements in mass %) is 1.20 or less, the microstructure being constituted by ferrite, lamellar pearlite, and spheroidal cementite, the average crystalline particle diameter of the ferrite being 10 μm or less, the area percentage of lamellar pearlite with a lamellar interval of 200 nm or less with respect to the microstructure of the lamellar pearlite being in a range of 20 to 50%, and the number of pieces of spheroidal cementite is $4 \times 10^5$ pieces/mm$^2$ or more.

It should be noted that this rolled steel material for induction hardening may further contain at least one selected from Cu, Ni, Mo, Ti, Nb, and V.

Patent Document 2 discloses a rolled steel material for induction hardening that contains, in mass %, C in an amount of 0.38 to 0.55%, Si in an amount of 1.0% or less, Mn in an amount of 0.20 to 2.0%, P in an amount of 0.020% or less, S in an amount of 0.10% or less, Cr in an amount of 0.10 to 2.0%, Al in an amount of 0.010 to 0.10%, N in an amount of 0.004 to 0.03%, the remaining portion being constituted by Fe and impurities, and has a chemical component in which the value of Ceq expressed by the equation [Ceq=C+(1/10)Si+(1/5)Mn+(5/22)Cr+1.65V−(5/7)S] (where C, Si, Mn, Cr, V, and S in the equation respectively express the amounts of the elements in mass %) is 1.20 or less, the total content of Si, Mn, and Cr satisfying 1.2 to 3.5%, the microstructure being constituted by ferrite, lamellar pearlite, and spheroidal cementite, and the average crystalline particle diameter of the ferrite being 10 μm or less, the area percentage of lamellar pearlite with respect to the microstructure being in a range of 20% or less (including 0%), and the number of pieces of spheroidal cementite being $6 \times 10^5$ pieces/mm$^2$ or more.

It should be noted that this rolled steel material for induction hardening may further contain at least one selected from Cu, Ni, Mo, Ti, Nb, and V.

LIST OF PRIOR ART DOCUMENTS

Patent Document

Patent Document 1: JP 2011-214130A
Patent Document 2: JP 2011-241466A

DISCLOSURE OF THE INVENTION

Problems to be Solved by the Invention

There has been increasing demand for a rolled round steel material for a steering rack bar, and a steering rack bar having a higher base material toughness for preventing damage and higher machinability for forming a deep hole compared to the rolled steel material proposed in Patent Documents 1 and 2.

An object of the present invention is to provide a rolled round steel material that can be favorably used as a raw material for a rack bar that undergoes induction hardening and a rack bar made of the same. In particular, an object of the present invention is to provide a rolled round steel material having an excellent base material toughness and machinability without adding high-cost elements or performing thermal refining, and a rack bar made of the same. Furthermore, an object of the present invention is to provide a rolled round steel material in which a deep hole can be easily formed in a lengthwise direction of the central portion in the diameter direction and a rack bar that prevents a crack that has appeared from developing.

It should be noted that a high base material toughness, which is an object of the present invention, means that in the state of a rolled steel material, the impact value obtained in a Charpy impact test at a test temperature of 25° C. with a standard test piece (referred to as "V notch Charpy impact test piece" hereinafter) defined in JIS Z 2242 (2005), which has a width of 10 mm and a V notch with a notch angle of 45 degrees, a notch depth of 2 mm, and a notch bottom radius of 0.25 mm, is 160 J/cm$^2$ or more. If the impact value obtained with the above-described test piece at a test temperature of 25° C. is 160 J/cm$^2$ or more, it is possible to secure a much higher level of safety at the time of traveling in an environment in which there is a high possibility of a steering rack bar being damaged, that is, rough road traveling, for example.

Means for Solving the Problems

In order to resolve the above-described issues, the inventors performed various laboratory experiments regarding a means for obtaining a high base material toughness and securing good machinability of the central portion without performing thermal refining on medium-carbon steel.

Specifically, first, the inventors studied a means for improving the base material toughness, referenced on a microstructure constituted by ferrite and lamellar pearlite. As a result, the following findings were obtained.

(A) If ferrite is formed to have a fine structure and is extended in a direction parallel to the rolling direction, and cementite in lamellar pearlite is formed into spheroidal cementite so that its microstructure contains lamellar pearlite in an amount of less than a specific percentage and spheroidal cementite in a specific amount or more, a resistance to cracks developing in the cross-section perpendicular to the rolling direction is increased, resulting in an increase in the base material toughness.

Next, the inventors studied the influence of the structure on machinability when a deep hole is formed, referenced on the microstructure constituted by ferrite and lamellar pearlite. As a result, the following findings were obtained.

(B) If the microstructure contains an excessive amount of spheroidal cementite, cutting resistance increases due to deterioration of chippability and machinability deteriorates. On the other hand, in the case where the structure contains lamellar pearlite in a specific percentage or more and spheroidal cementite in less than a specific amount, cutting resistance decreases due to an increase in chippability, and therefore the rolled round steel material has excellent machinability.

In view of this, in order to further improve both base material toughness and machinability, the inventors further studied the influence of element components. As a result, the following findings were obtained.

(C) S binds to Mn to form MnS, resulting extension in the longitudinal direction of, the steel material (direction parallel to the rolling direction) and an improvement in toughness. Moreover, if the steel material contains a specific amount of S, cutting resistance decreases due to improvement in chippability, and thus the machinability become favorable.

In view of this, based on the findings of (A) to (C) described above, more detailed studies were performed. As a result, the following important findings were obtained.

(D) A portion that requires the base material toughness for preventing damage as a rolled round steel material for a steering rack bar is a region extending from the surface of the round steel material to a position located a distance of ½ the radius therefrom. Therefore, in the case of a rolled round steel material having a microstructure constituted by ferrite, lamellar pearlite, and cementite, if the microstructure in the above-described region is constituted by fine ferrite that is extended in the direction parallel to the rolling direction, a specific percentage or less of lamellar pearlite, and a specific amount or more of spheroidal cementite, a base material toughness for preventing damage can be obtained.

(E) On the other hand, if the microstructure contains lamellar pearlite in an amount of a specific percentage or more and spheroidal cementite in less than a specific amount in the central portion of the rolled round steel material constituted by ferrite, lamellar pearlite, and cementite, excellent machinability can be obtained.

Furthermore, based on the findings of (A) to (E) above, in order to achieve a further improvement in toughness, specifically, in order that in the state of the rolled steel material, the impact value that is obtained in the Charpy impact test with a V notch Charpy impact test piece at a test temperature of 25° C. reached to 160 J/cm$^2$ or more, the inventors studied the influence of element components. As a result, the following findings were obtained.

(F) B has properties of suppressing release of strain at a high temperature and suppressing segregation of P and S in austenite grain boundaries at the time of induction hardening by strengthening grain boundaries. As a result, the toughness further increases.

The present invention was made based on the above-described findings, and comprises a rolled round steel material for a steering rack bar, and a steering rack bar, which will be described later.

(1) A rolled round steel material for a steering rack bar, comprising: in mass %, C in an amount of 0.38 to 0.55%; Si in an amount of 1.0% or less; Mn in an amount of 0.20 to 2.0%; S in an amount of 0.005 to 0.10%; Cr in an amount of 0.01 to 2.0%; Al in an amount of 0.003 to 0.10%; B in an amount of 0.0005 to 0.0030%; Ti in an amount of 0.047% or less; Cu in an amount of 0 to 1.0%; Ni in an amount of 0 to 3.0%; Mo in an amount of 0 to 0.50%; Nb in an amount of 0 to 0.10%; V in an amount of 0 to 0.30%; Ca in an amount of 0 to 0.005%; and Pb in an amount of 0 to 0.30%, a remaining portion being constituted by Fe and impurities, the impurities containing P in an amount of 0.030% or less and N in an amount of 0.008% or less, and the rolled round steel material having a chemical composition satisfying Equation (1) below, $$3.4N \leq Ti \leq 3.4N + 0.02 \tag{1}$$

where a symbol of an element indicates a content of the element in mass %, in which a microstructure is constituted by ferrite, lamellar pearlite, and cementite, in a cross-section perpendicular to a rolling direction, in a region extending from a surface to a position located a distance of ½ the radius therefrom, an average particle diameter of the ferrite is 10 μm or less, an area percentage of the lamellar pearlite is less than 20%, a number of pieces of spheroidal cementite of the cementite is $4 \times 10^5$ pieces/mm$^2$ or more, and, in a central portion, an area percentage of the lamellar pearlite is 20% or more and a number of pieces of spheroidal cementite of the cementite is less than $4 \times 10^5$ pieces/mm$^2$, and in a cross-section that passes through a centerline of the round steel material and is parallel to the rolling direction, an average aspect ratio of the ferrite in a region extending from a surface to a position located a distance of ½ the radius therefrom is 3 or more.

(2) The rolled round steel material for a steering rack bar according to (1) above, comprising, in mass %, at least one selected from Cu in an amount of 0.05 to 1.0%, Ni in an amount of 0.05 to 3.0%, and Mo in an amount of 0.05 to 0.50%.

(3) The rolled round steel material for a steering rack bar according to (1) above, comprising, in mass %, at least one selected from Nb in an amount of 0.010 to 0.10% and V in an amount of 0.01 to 0.30%.

(4) The rolled round steel material for a steering rack bar according to (1) above, comprising, in mass %, at least one selected from Ca in an amount of 0.0005 to 0.005% and Pb in an amount of 0.05 to 0.30%.

(5) A steering rack bar in which the rolled round steel material for a steering rack bar according to any of (1) to (4) above is used without thermal refining.

"Impurities" indicate substances coming from ore, which is the raw material, scraps, the manufacturing environment, or the like, when a steel material is industrially manufactured.

"Spheroidal cementite" indicates cementite having a ratio of a major axis L to a minor axis W (L/W) that is 2.0 or less.

"Central portion" indicates a portion extending from the center to a position located a distance of ¼ the radius therefrom.

"Use without thermal refining" indicates use without performing "thermal refining", namely, hardening and tempering.

Advantageous Effects of the Invention

It is not necessary for the rolled round steel material for a steering rack bar of the present invention to contain high-cost V, and even if thermal refining is not performed, the rolled round steel material has good machinability for forming a deep hole in the central portion and a high base material toughness, or in other words, the impact value obtained in the Charpy impact test with a V notch Charpy impact test piece at a test temperature of 25° C. in the state of the rolled round steel material is 160 J/cm$^2$ or more, and therefore the rolled round steel material is favorably used as the raw material for a steering rack bar.

In addition, the steering rack bar of the present invention can be obtained by using the above-described rolled round steel material for a steering rack bar without thermal refining.

BRIEF DESCRIPTION OF THE DRAWINGS

In FIG. 2, (a) is a front view (overall view), (b) is a side view, and (c) is an enlarged view of cross-section A-A of a tooth-shaped portion. It should be noted that the unit of the dimension in FIGS. 2(a) to 2(c) is "mm".

MODE FOR CARRYING OUT THE INVENTION

Figure 1:
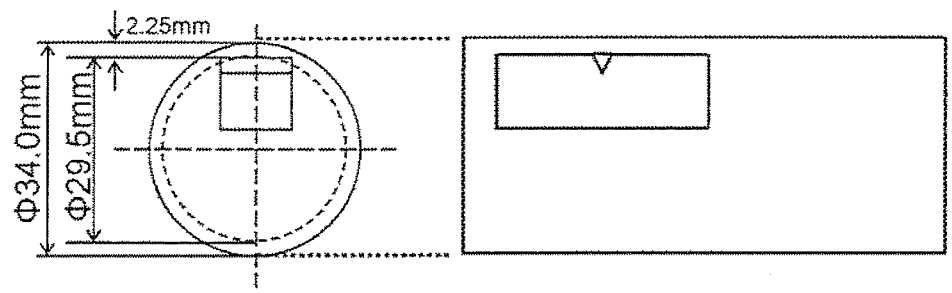
FIG. 1 is a diagram schematically illustrating the direction of a notch of a V notch Charpy impact test piece collected from a steel bar in Working Example 1.

Hereinafter, essential elements of the present invention will be described in detail. It should be noted that "%" of the content of each element means "mass %" in the following description.

1. Chemical Composition:
C: 0.38 to 0.55%

C has properties of improving the strength and induction hardenability of steel and the strength of a quench-hardened layer formed by induction hardening. However, if the content of C is less than 0.38%, desired effects resulting from the properties cannot be obtained. On the other hand, if the content of C exceeds 0.55%, the base material toughness decreases. Therefore, the content of C is set to 0.38 to 0.55%. It should be noted that in order to stably obtain the above-described effects, the content of C is preferably set to 0.40% or more. Also, the content of C is preferably set to 0.51% or less.

Si: 1.0% or less

Si is a deoxidizing element, and is an element for improving the strength of ferrite by solid-solution strengthening. However, if the content of Si exceeds 1.0%, the machinability decreases and it becomes difficult to form a deep hole. Therefore, the content of Si is set to 1.0% or less. The content of Si is preferably set to 0.8% or less.

It should be noted that Al, which will be described later, also has deoxidizing properties, and therefore it is not necessary to define the lower limit of the content of Si, in particular. However, in order to reliably secure the strength with the above-described solid-solution strengthening properties of Si, the content of Si is preferably set to 0.03% or more and more preferably set to 0.10% or more.

Mn: 0.20 to 2.0%

Mn binds to S to form MnS, and has properties of reducing cutting resistance by increasing machinability, especially chippability required when a deep hole is formed, and has effects of increasing toughness due to extended MnS suppressing crack development. In addition, Mn is an element that is effective in improvement in induction hardenability and improves the strength of ferrite by solid-solution strengthening. However, if the content of Mn is less than 0.20%, desired effects resulting from the above-described properties cannot be obtained. On the other hand, if the content of Mn exceeds 2.0%, the machinability decreases and it becomes difficult to form a deep hole. Therefore, the content of Mn is set to 0.20 to 2.0%. It should be noted that in order to stably obtain the above-described effects with a lower cost for alloy, the content of Mn is preferably set to 0.40% or more and 1.50% or less.

S: 0.005 to 0.10%

S is an important element in the present invention. S binds to Mn to form MnS, and has properties of reducing cutting resistance by increasing machinability, especially chippability required when a deep hole is formed, and has effects of increasing toughness due to extended MnS suppressing crack development. However, if the content of S is less than 0.005%, such effects cannot be obtained. On the other hand, if the content of S increases and MnS is formed excessively, the toughness conversely decreases. Therefore, the content of S is set to 0.005 to 0.10%. It should be noted that the content of S is preferably set to 0.010% or more and more preferably set to 0.015% or more. Also, the content of S is preferably set to 0.08% or less.

Cr: 0.01 to 2.0%

Cr is an element that is effective in improvement in induction hardenability and improves the strength of ferrite by solid-solution strengthening, and therefore it is necessary for the content of Cr to be 0.01% or more. However, if the content of Cr exceeds 2.0%, the machinability decreases and it becomes difficult to form a deep hole. Therefore, the content of Cr is set to 0.01 to 2.0%. It should be noted that the content of Cr is preferably set to 0.05% or more and more preferably set to 0.10% or more. In addition, the content of Cr is preferably set to 1.8% or less.

Al: 0.003 to 0.10%

Al has deoxidizing properties. However, if the content of Al is less than 0.003%, desired effects resulting from the above-described properties cannot be obtained. On the other hand, if the content of Al exceeds 0.10%, induction hardenability significantly decreases, which incurs deterioration of the base material toughness as well. Therefore, the content of Al is set to 0.003 to 0.10%. It should be noted that the content of Al is preferably set to 0.08% or less. On the other hand, in order to stably obtain the deoxidizing effects of Al, the content of Al is preferably set to 0.005% or more and more preferably set to 0.10% or more.

B: 0.0005 to 0.0030%

B suppresses the release of strain at a high temperature by strengthening grain boundaries and has properties of improving induction hardenability and properties of suppressing the segregation of P and S in austenite grain boundaries at the time of induction hardening, and as a result, the toughness significantly increases. The above-described effects are significant when the content of B is 0.0005% or more. However, if the content of B exceeds 0.0030%, the above-described effects are not further improved and the cost increases. Therefore, the content of B is set to 0.0005 to 0.0030%. The content of B is preferably set to 0.0010% or more and 0.0020% or less.

Ti: 0.047% or less

Ti preferentially binds to N, which is the element of impurities in the steel, and fixes N so that the formation of BN is suppressed and B is present as solid-solution B. Therefore, Ti is an element that is effective in securing the above-described effects of B strengthening grain boundaries, improving induction hardenability, and suppressing the segregation of P and S in austenite grain boundaries at the time of induction hardening. However, if the content of Ti exceeds 0.047%, the base material toughness significantly decreases. Therefore, the content of Ti is set to 0.047% or less.

Cu: 0 to 1.0%

Cu has properties of improving induction hardenability and increasing base material toughness, and therefore Cu may be included in order to improve the base material toughness. However, if the content of Cu exceeds 1.0%, the machinability decreases and it becomes difficult to form a deep hole. Therefore, the content of Cu in the case of being included is set to 1.0% or less. It should be noted that the content of Cu is preferably set to 0.80% or less.

On the other hand, in order to stably obtain the above-described base material toughness improving effects of Cu, the content of Cu is preferably set to 0.05% or more and more preferably set to 0.10% or more.

Ni: 0 to 3.0%

Ni has properties of improving induction hardenability and increasing base material toughness, and therefore Ni may be included in order to improve the base material toughness. However, if the content of Ni exceeds 3.0%, the machinability decreases and it becomes difficult to form a deep hole. Therefore, the content of Ni in the case of being included is set to 3.0% or less. It should be noted that the content of Ni is preferably set to 2.0% or less.

On the other hand, in order to stably obtain the above-described base material toughness improving effects of Ni, the content of Ni is preferably set to 0.05% or more and more preferably set to 0.10% or more.

Mo: 0 to 0.50%

Mo has properties of improving induction hardenability and increasing base material toughness, and therefore Mo may be included in order to improve the base material toughness. However, if the content of Mo exceeds 0.50%, the machinability decreases and it becomes difficult to form a deep hole. Therefore, the content of Mo in the case of being included is set to 0.50% or less. It should be noted that the content of Mo is preferably set to 0.40% or less.

On the other hand, in order to stably obtain the above-described base material toughness improving effects of Mo, the content of Mo is preferably set to 0.05% or more and more preferably set to 0.10% or more.

It should be noted that the rolled round steel material may contain one or more of the above-described Cu, Ni, and Mo. It should be noted that although the total amount of these elements may be 4.50%, the total amount thereof is preferably set to 3.20% or less.

Nb: 0 to 0.10%

Nb binds to C or N in the steel to form carbide or carbonitride, and has properties of refining crystal grains. Also, Nb has properties of improving the strength of steel. However, if the content of Nb exceeds 0.10%, a decrease in the toughness is incurred in addition to the effects being not further improved and the cost increasing. Therefore, the content of Nb in the case of being included is set to 0.10% or less. It should be noted that the content of Nb is preferably set to 0.08% or less.

On the other hand, in order to stably obtain the crystal grain refining effects of Nb, the content of Nb is preferably set to 0.010% or more and more preferably set to 0.015% or more.

V: 0 to 0.30%

V binds to C or N in the steel to form carbide or carbonitride, and has properties of refining crystal grains. Also, V has properties of improving the strength of steel. However, if the content of V exceeds 0.30%, a decrease in the toughness is incurred in addition to the effects being not further improved and the cost increasing. Therefore, the content of V in the case of being included is set to 0.30% or less. It should be noted that the content of V is preferably set to 0.25% or less.

On the other hand, in order to stably obtain the crystal grain refining effects of V, the content of V is preferably set to 0.01% or more and more preferably set to 0.02% or more.

It should be noted that the rolled round steel material may contain one or both of Nb and V described above. It should be noted that although the total amount of these elements may be 0.40%, the total amount thereof is preferably set to 0.33% or less.

Ca: 0 to 0.005%

Ca has properties of improving the machinability of steel. Therefore, Ca may be included as required. However, if the content of Ca exceeds 0.005%, hot workability decreases, resulting in a decrease in manufacturability. Therefore, the content of Ca in the case of being included is set to 0.005% or less. The content of Ca is preferably set to 0.0035% or less.

On the other hand, in order to stably obtain the above-described machinability improving effects of Ca, the content of Ca is desirably set to 0.0005% or more.

Pb: 0 to 0.30%

Similarly to Ca, Pb has properties of improving the machinability of steel. Therefore, Pb may be included as required. However, if the content of Pb exceeds 0.30%, the above-described machinability improving effects are not further improved, hot workability decreases excessively, and it becomes difficult to perform manufacturing. Therefore, the content of Pb in the case of being included is set to 0.30% or less.

On the other hand, in order to stably obtain the above-described machinability improving effects of Pb, the content of Pb is desirably 0.05% or more.

It should be noted that the rolled round steel material may contain one or both of Ca and Pb described above. The total content of these elements is preferably 0.30% or less.

The chemical composition of the rolled round steel material for a steering rack bar of the present invention is such that the remaining portion is constituted by Fe and impurities, the impurities contain P in an amount of 0.030% or less and N in an amount of 0.008% or less, and the following expression is satisfied.

$$3.4N \leq Ti \leq 3.4N+0.02 \quad (1)$$

P: 0.030% or less

P is included in the steel as the impurities, causes grain boundary segregation and center segregation, and incurs a decrease in the base material toughness, and in particular, if the content of P exceeds 0.030%, the base material toughness significantly decreases. Therefore, the content of P is set to 0.030% or less. It should be noted that the content of P is preferably set to 0.020% or less.

N: 0.008% or less

N is also included in the steel as the impurities. N has a high affinity for B and in the case of binding to B in the steel to form BN, effects of strengthening grain boundaries, effects of improving induction hardenability, and effects of suppressing segregation of P and S in the austenite grain boundaries at the time of induction hardening resulting from the steel containing B cannot be achieved. In particular, if the content of N exceeds 0.008% due to an increase in the content of N, the above-described effects resulting from the steel containing B cannot be obtained. Therefore, the content of N is set to 0.008% or less.

$$3.4N \leq Ti \leq 3.4N+0.02$$

A rolled round steel material for a steering rack bar according to the present invention is to have a chemical composition satisfying the following expression.

$$3.4N \leq Ti \leq 3.4N+0.02 \quad (1)$$

As described above, the symbol of an element in the above-described expression (1) indicates the content of the element in mass %.

This is because even if the content of Ti and the content of N are respectively in the above-described ranges, in the case where the content of Ti is less than [3.4N], the N in the steel is not sufficiently fixed by Ti and the N binds to B to form BN, and therefore the above-described effects of B cannot be sufficiently exhibited, whereas if the content of Ti exceeds [3.4N+0.02], a reduction in the toughness of the base material cannot be avoided.

2. Microstructure:

The microstructure of the rolled round steel material of the present invention is constituted by ferrite, lamellar pearlite, and cementite, in a cross-section perpendicular to the rolling direction, in a region extending from the surface to a position located a distance of ½ the radius therefrom, the average particle diameter of the ferrite is to be 10 μm or less, the area percentage of the lamellar pearlite is to be less than 20%, and the number of pieces of spheroidal cementite of the cementite is to be $4 \times 10^5$ pieces/mm$^2$ or more, and furthermore, in a central portion, the area percentage of the lamellar pearlite is to be 20% or more and the number of pieces of spheroidal cementite of the cementite is to be less than $4 \times 10^5$ pieces/mm$^2$, and moreover in a cross-section that passes through the centerline of the round steel material and is parallel to the rolling direction, the average aspect ratio of the ferrite in the region extending from the surface to the position located a distance of ½ the radius therefrom is to be 3 or more.

In the case of the rolled round steel material of the present invention, if the average particle diameter of ferrite in the region extending from the surface to the position located a distance of ½ the radius therefrom exceeds 10 μm in the cross-section perpendicular to the rolling direction, it is difficult to obtain a target base material toughness. Therefore, the above-described average particle diameter of ferrite is set to 10 μm or less. It should be noted that the above-described average particle diameter of ferrite is preferably set to 8 μm or less.

An extremely small average particle diameter of ferrite is preferable for achieving strengthening by crystal grain refining, but special processing conditions or facilities are needed to form crystal grains on the order of sub-microns and it is thus difficult to realize the formation of such crystal grains on an industrial scale. Therefore, the lower limit of the above-described average particle diameter of ferrite at a size that can be realized industrially is about 1 μm.

It should be noted that it is sufficient that the above-described average particle diameter of ferrite in the region extending from the surface to the position located a distance of ½ the radius therefrom in the cross-section perpendicular to the rolling direction is obtained by obtaining ferrite particle diameters at three locations, namely, at a position located 1 mm from the surface of the rolled round steel material, a position located at a distance of ¼ the radius from the surface (hereinafter, referred to as "R/4 position", and it should be noted that "R" indicates the radius of the rolled round steel material and the same applies to the following), and a position located at a distance of ½ the radius from the surface (hereinafter, referred to as "R/2 position"), and then finding the arithmetic mean of the ferrite particle diameters at these three locations, for example.

In addition, in the case of the rolled round steel material of the present invention, if the area percentage of lamellar pearlite in the region extending from the surface to the position located a distance of ½ the radius therefrom is 20% or more in the cross-section perpendicular to the rolling direction, a decrease in the base material toughness is incurred. Therefore, the above-described area percentage of lamellar pearlite is set to less than 20%. The above-described area percentage of lamellar pearlite is preferably 15% or less and may be 0%.

It should be noted that it is sufficient that the area percentage of lamellar pearlite in the region extending from the surface to the position located a distance of ½ the radius therefrom in the above-described cross-section perpendicular to the rolling direction is obtained by obtaining area percentages of lamellar pearlite at three locations, namely, at a position located 1 mm from the surface of a rolled round steel material, and the R/4 position and the R/2 position, and then finding an arithmetic mean of the three area percentages of lamellar pearlite at these three locations, for example.

Furthermore, in the case of the rolled round steel material of the present invention, if the number of pieces of spheroidal cementite in the region extending from the surface to the position located a distance of ½ the radius therefrom is less than $4 \times 10^5$ pieces/mm$^2$ in the cross-section perpendicular to the rolling direction, a decrease in the base material toughness is incurred. Therefore, the above-described number of pieces of spheroidal cementite is set to $4 \times 10^5$ pieces/mm$^2$ or more. The above-described number of pieces of spheroidal cementite is preferably $5.0 \times 10^5$ pieces/mm$^2$ or more and $1.0 \times 10^{12}$ pieces/mm$^2$ or less.

It should be noted that it is sufficient that the number of pieces of spheroidal cementite in the region extending from the surface to the position located a distance of ½ the radius therefrom in the above-described cross-section perpendicular to the rolling direction is obtained by obtaining the respective numbers of pieces of spheroidal cementite at three locations, namely, at the position located 1 mm from the surface of the rolled round steel material, and the R/4 position and the R/2 position, and then finding the arithmetic mean of the numbers of pieces of spheroidal cementite at these three locations, for example.

Furthermore, in the case of the rolled round steel material for a steering rack bar of the present invention, if the area percentage of lamellar pearlite in a central portion is less than 20% in the cross-section perpendicular to the rolling direction, the chippability decreases due to an increase in the toughness, that is, the machinability decreases due to an increase in the cutting resistance. Therefore, the above-described area percentage of lamellar pearlite is set to 20% or more. The above-described area percentage of lamellar pearlite is preferably 25% or more and 80% or less. As described above, "central portion" indicates a portion extending from the center to a position located a distance of ¼ the radius therefrom.

It should be noted that it is sufficient that the area percentage of lamellar pearlite in the central portion in the above-described cross-section perpendicular to the rolling direction is obtained by obtaining the respective area percentages of lamellar pearlite at two locations, namely, at a position located a distance of ¾ the radius from the surface of the rolled round steel material (referred to as "3R/4 position" hereinafter), and at the center, and then finding the arithmetic mean of the obtained area percentages of lamellar pearlite at these two locations.

In the case of the rolled round steel material of the present invention, if the number of pieces of spheroidal cementite in the central portion is $4 \times 10^5$ pieces/mm$^2$ or more in the cross-section perpendicular to the rolling direction, the chippability decreases due to an increase in the toughness and a decrease in the machinability is incurred due to an increase in the cutting resistance. Therefore, the above-described number of pieces of spheroidal cementite is set to less than $4 \times 10^5$ pieces/mm$^2$ Although the above-described number of pieces of spheroidal cementite may be 0 pieces/mm$^2$, the above-described number of pieces of spheroidal cementite may be preferably $1 \times 10^2$ pieces/mm$^2$ or more and $3 \times 10^5$ pieces/mm$^2$ or less.

It should be noted that it is sufficient that the number of pieces of spheroidal cementite in the central portion in the above-described cross-section perpendicular to the rolling direction is obtained by obtaining the respective numbers of pieces of spheroidal cementite at two locations, namely, at the 3R/4 position and the center of the rolled round steel material, and then finding the arithmetic mean of the numbers of pieces of spheroidal cementite at these two locations.

In the case of the rolled round steel material of the present invention, if the average aspect ratio of ferrite in the region extending from the surface to the position located a distance of ½ the radius therefrom is less than 3 in the cross-section that passes through the centerline of the round steel material and is parallel to the rolling direction, cracks are likely to develop in the cross-section perpendicular to the rolling direction, which incurs a decrease in the toughness. Therefore, the above-described aspect ratio of ferrite is set to 3 or more. The above-described average aspect ratio of ferrite is preferably 4 or more and 45 or less.

It should be noted that it is sufficient that the average aspect ratio of ferrite in the above-described cross-section that passes through the centerline of the round steel material and is parallel to the rolling direction is obtained by obtaining the respective average aspect ratios of ferrite at three locations, namely, at the position located 1 mm from the surface of the rolled round steel material, and the R/4 position and the R/2 position, and then finding the arithmetic mean of the obtained average aspect ratios of ferrite at these three locations, for example.

The above-described microstructure of the rolled round steel material of the present invention can be obtained by hot rolling and cooling a rolling material having the above-described chemical composition, as shown below, for example.

As the hot rolling method, a completely continuous hot rolling method including two or more hot rolling steps is favorable for manufacturing the rolled round steel material for a steering rack bar of the present invention. Thus, the following description is given based on rolling performed by the above-described completely continuous hot rolling method (simply referred to as "completely continuous hot rolling" hereinafter).

After a rolling material having the above-described chemical composition is heated to a temperature range of 670 to 880° C., the completely continuous hot rolling is started.

If the heating temperature is higher than 880° C., there are cases in which, in the cross-section perpendicular to the rolling direction, strain is likely to be released and at least one of the ferrite average particle diameter, the lamellar pearlite area percentage, and the number of pieces of spheroidal cementite in the region extending from the surface to a position located a distance of ½ the radius therefrom does not satisfy the conditions described in the section "2. Microstructure". Also, if the heating temperature is lower than 670° C., there are cases in which, in the above-described cross-section, at least one of the lamellar pearlite area percentage and the number of pieces of spheroidal cementite in the central portion does not satisfy the above-described microstructure conditions.

Therefore, it is preferable that the completely continuous hot rolling is started after a rolling material having the above-described chemical composition is heated to a temperature range of 670 to 880° C.

It should be noted that in heating at the above-described temperature range of 670 to 880° C., which is performed before hot rolling, there are cases in which heat treatment is performed for a long period of time in order to not only increase the temperature of the rolling material (raw material) to a predetermined region but also uniformize the temperature of the raw material in the cross-section, and in this case, ferrite decarburization may occur on the raw material surface. Therefore, in order to suppress the above-described ferrite decarburization, the heating time at the above-described temperature range is preferably set to 3 hours or less.

It is preferable that the completely continuous hot rolling performed after the raw material is heated to the above-described temperature range is set to satisfy the following conditions [1] and [2].

[1] The surface temperature of the rolling material is 500 to 820° C. and the cumulative reduction of area in a temperature range of 650 to 820° C. is 30% or more and the cumulative reduction of area in a temperature range of 500° C. or more to less than 650° C. is 35% or more. It should be noted that the above-described "surface temperature of the rolling material" does not include the surface temperature of a rolling material during an intercooling step, which will be described later.

[2] Letting the completely continuous hot rolling end point be "v (m/s)", that is, a rolling material speed on the final rolling mill exit side (referred to as "finishing speed" hereinafter), the total reduction of area in the completely continuous hot rolling be "Rd (%)", and the rolling material heating temperature be "T (° C.)", equation fn (1), which is expressed below, satisfies 0 or more.

$$fn(1)=v \cdot Rd/100-(1000-T)/100$$

It should be noted that the "total reduction of area" indicates the value (%) obtained using the expression $\{(A_0-A_f)/A_0\} \times 100$, where the cross-section of a rolling material before rolling in the completely continuous hot rolling is $A_0$ and the cross-section after the rolling material exits from the final rolling mill is $A_f$.

Regarding [1], if the surface temperature of the rolling material exceeds 820° C. during rolling, there are cases in which strain is likely to be released and in the cross-section perpendicular to the rolling direction, at least one of the ferrite average particle diameter, the lamellar pearlite area percentage, and the number of pieces of spheroidal cementite in the region extending from the surface to a position located a distance of ½ the radius therefrom does not satisfy the above-described conditions described in the section "2. Microstructure". Also, in the case where the above-described temperature is lower than 500° C., the mill load significantly increases and fractures are likely to occur during rolling. Therefore, the surface temperature of a rolling material during rolling is preferably 500 to 820° C.

In addition, if the cumulative reduction of area in a temperature range of 650 to 820° C. is less than 30%, there are cases in which, in the cross-section perpendicular to the rolling direction, at least one of the ferrite average particle diameter, the lamellar pearlite area percentage, and the number of pieces of spheroidal cementite in the region extending from the surface to the position located a distance of ½ the radius therefrom does not satisfy the above-described microstructure conditions. In order to prevent excessive extension of manufacturing lines, the upper limit of the above-described cumulative reduction of area in the above-described temperature range of 650 to 820° is about 99.5%.

Also, if the cumulative reduction of area in a temperature range of 500° C. or more to less than 650° C. is less than 35%, there are cases in which one or both of the average aspect ratio of ferrite in the region extending from the surface to the position located a distance of ½ the radius therefrom in the cross-section that passes through the centerline of the rolling material and is parallel to the rolling direction, and the number of pieces of spheroidal cementite in the region extending from the surface to the position located a distance of ½ the radius therefrom in the cross-section perpendicular to the rolling direction does not satisfy the above-described microstructure conditions. In order to prevent excessive extension of manufacturing lines, the upper limit of the cumulative reduction of area in a temperature range of 500° C. or more to less than 650° C. is about 80%.

[2] is an equation obtained by experience so that the microstructure of the central portion in the cross-section perpendicular to the rolling direction is a microstructure described in the section "2. Microstructure". If fn (1) is less than 0, there are cases in which, in the cross-section perpendicular to the rolling direction, one or both of the lamellar pearlite area percentage and the number of pieces of spheroidal cementite of the central portion does not satisfy the above-described microstructure conditions.

When the rolled round steel material for a rack bar according to the present invention is rolled, intercooling such as water cooling may be performed in an intermediate step. It should be noted that there are cases in which the surface temperature of a rolling material temporarily becomes lower than 500° C. in the intercooling step. However, even if the surface temperature of the rolling material falls below 500° C. due to the cooling, if the next rolling step is started after the temperature returns to 500° C. or more due to sensible heat of the inside of the rolling material, it may be assumed that the influence of the surface temperature of the rolling material temporarily being lower than 500° C. due to cooling is eliminated. Also, if austenite of the rolling material that is not transformed is transformed into a hard phase such as martensite or bainite, there are cases in which the microstructure defined in the present invention cannot be obtained. In order to prevent this, desirably, the intercooling step is cooling such that a time Δt starting from when the surface temperature of the rolling material becomes temporarily lower than 500° C. to when the surface temperature returns to 500° C. or more is 10 seconds or less. Furthermore, in order to achieve manufacturing of rolled round steel materials by completely continuous hot rolling, which is more stably, preferably, the intercooling step is a cooling step in which Δt is 8 seconds or less.

After the completely continuous hot rolling is performed in the above-described manner to process the material into a predetermined shape, it is preferable to perform final cooling under the condition that the surface cooling speed is 0.5 to 200° C./s in a temperature range to 500° C.

If the surface cooling speed in the above-described range is less than 0.5° C./s after the completely continuous hot rolling ends, there are cases in which, in the cross-section perpendicular to the rolling direction, one or both of the lamellar pearlite area percentage and the number of pieces of spheroidal cementite of the central portion does not satisfy the conditions described in the section "2. Microstructure", whereas if the surface cooling speed exceeds 200° C./s, austenite that is not transformed is transformed into a hard phase such as martensite or bainite.

Hereinafter, the present invention will be described specifically by means of examples.

EXAMPLE

Working Embodiment 1

Square billets (each billet has a length of 10 m and a 160 mm×160 mm square shape) made of steels A to Z having the chemical compositions shown in Table 1 were prepared.

TABLE 1

| | chemical composition (mass %) remaining portion: Fe and impurities | | | | | | | | | |
|---|---|---|---|---|---|---|---|---|---|---|
| steel | C | Si | Mn | P | S | Cr | Al | B | N | 3.4N |
| A | 0.41 | 0.55 | 0.42 | 0.007 | 0.022 | 1.12 | 0.022 | 0.0016 | 0.003 | 0.010 |
| B | 0.44 | 0.21 | 0.81 | 0.011 | 0.018 | 0.07 | 0.032 | 0.0025 | 0.004 | 0.014 |
| C | 0.51 | 0.15 | 1.38 | 0.015 | 0.062 | 0.89 | 0.017 | 0.0022 | 0.005 | 0.017 |
| D | 0.46 | 0.51 | 0.41 | 0.013 | 0.015 | 0.11 | 0.061 | 0.0009 | 0.002 | 0.007 |

TABLE 1-continued

| E | 0.39 | 0.25 | 0.83 | 0.013 | 0.021 | 0.13 | 0.037 | 0.0024 | 0.007 | 0.024 |
|---|---|---|---|---|---|---|---|---|---|---|
| F | 0.54 | 0.18 | 0.61 | 0.012 | 0.044 | 0.14 | 0.026 | 0.0016 | 0.003 | 0.010 |
| G | 0.43 | 0.19 | 0.79 | 0.008 | 0.024 | 0.21 | 0.037 | 0.0027 | 0.005 | 0.017 |
| H | 0.42 | 0.24 | 0.75 | 0.005 | 0.007 | 0.11 | 0.028 | 0.0019 | 0.003 | 0.010 |
| I | 0.44 | 0.22 | 0.84 | 0.012 | 0.022 | 0.18 | 0.019 | 0.0019 | 0.006 | 0.020 |
| J | 0.47 | 0.31 | 0.88 | 0.008 | 0.019 | 0.09 | 0.032 | 0.0013 | 0.005 | 0.017 |
| K | 0.46 | 0.18 | 0.72 | 0.011 | 0.024 | 0.07 | 0.022 | 0.0007 | 0.007 | 0.024 |
| L | 0.45 | 0.28 | 0.69 | 0.014 | 0.023 | 0.15 | 0.025 | 0.0017 | 0.006 | 0.020 |
| M | 0.44 | 0.33 | 0.75 | 0.011 | 0.088 | 0.14 | 0.031 | 0.0010 | 0.004 | 0.014 |
| N | 0.41 | 0.26 | 1.02 | 0.006 | 0.061 | 0.13 | 0.071 | 0.0021 | 0.004 | 0.014 |
| O | 0.43 | 0.27 | 0.98 | 0.009 | 0.055 | 1.01 | 0.033 | 0.0021 | 0.005 | 0.017 |
| P | 0.45 | 0.23 | 1.44 | 0.010 | 0.020 | 1.25 | 0.022 | 0.0028 | 0.003 | 0.010 |
| Q | 0.44 | 0.25 | 0.79 | 0.024 | 0.016 | 0.07 | 0.037 | 0.0027 | 0.004 | 0.014 |
| R | 0.42 | *1.25 | 0.75 | 0.009 | 0.021 | 0.09 | 0.027 | 0.0022 | 0.005 | 0.017 |
| S | 0.45 | 0.24 | *2.31 | 0.011 | 0.018 | 0.51 | 0.035 | 0.0023 | 0.007 | 0.024 |
| T | *0.62 | 0.23 | 0.81 | 0.006 | 0.033 | 0.12 | 0.016 | 0.0016 | 0.004 | 0.014 |
| U | 0.48 | 0.26 | 0.83 | 0.018 | 0.029 | *2.41 | 0.044 | 0.0013 | 0.002 | 0.007 |
| V | 0.39 | 0.21 | 0.85 | 0.022 | 0.018 | 0.13 | 0.047 | *— | 0.005 | 0.017 |
| W | 0.41 | 0.18 | 0.88 | 0.012 | 0.026 | 0.09 | 0.033 | 0.0010 | *0.012 | 0.041 |
| X | 0.44 | 0.29 | 0.79 | 0.011 | 0.031 | 0.25 | 0.024 | 0.0022 | 0.005 | 0.017 |
| Y | 0.43 | 0.20 | 0.74 | 0.009 | 0.017 | 0.17 | 0.023 | 0.0009 | 0.003 | 0.010 |
| Z | 0.42 | 0.19 | 0.73 | 0.016 | 0.011 | 0.13 | 0.061 | 0.0017 | 0.004 | 0.014 |

| | chemical composition (mass %) remaining portion: Fe and impurities | | | | | | | |
|---|---|---|---|---|---|---|---|---|
| steel | 3.4N + 0.02 | Ti | Cu | Ni | Mo | Nb | V | Ca | Pb |
| A | 0.030 | 0.020 | — | — | — | — | — | — | — |
| B | 0.034 | 0.021 | — | — | — | — | — | — | — |
| C | 0.037 | 0.036 | — | — | — | — | — | — | — |
| D | 0.027 | 0.021 | — | — | — | — | — | — | — |
| E | 0.044 | 0.041 | — | — | — | — | — | — | — |
| F | 0.030 | 0.029 | — | — | — | — | — | — | — |
| G | 0.037 | 0.026 | — | — | — | — | — | — | — |
| H | 0.030 | 0.011 | — | — | — | — | — | — | — |
| I | 0.040 | 0.027 | 0.14 | — | — | — | — | — | — |
| J | 0.037 | 0.020 | — | 0.16 | — | — | — | — | — |
| K | 0.044 | 0.043 | — | — | 0.09 | — | — | — | — |
| L | 0.040 | 0.031 | — | — | — | 0.018 | — | — | — |
| M | 0.034 | 0.017 | — | — | — | — | 0.10 | — | — |
| N | 0.034 | 0.030 | — | — | — | — | — | 0.002 | — |
| O | 0.037 | 0.032 | — | — | — | — | — | — | 0.11 |
| P | 0.030 | 0.015 | — | — | — | — | — | 0.002 | 0.08 |
| Q | 0.034 | 0.022 | 0.13 | 0.11 | — | 0.011 | — | 0.003 | — |
| R | 0.037 | 0.027 | — | — | — | — | — | — | — |
| S | 0.044 | 0.039 | — | — | — | — | — | — | — |
| T | 0.034 | 0.023 | — | — | — | — | 0.04 | — | — |
| U | 0.027 | 0.012 | — | — | — | — | — | — | 0.12 |
| V | 0.037 | 0.018 | — | — | — | — | — | — | — |
| W | 0.061 | 0.042 | — | — | — | — | — | — | — |
| X | 0.037 | *0.057 | — | — | — | — | — | — | — |
| Y | 0.030 | *0.007 | — | — | — | — | — | — | — |
| Z | 0.034 | *0.044 | — | — | — | — | — | — | — |

*mark indicates that chemical composition conditions defined in the present invention are not satisfied The above-described square billets were rolled by a completely continuous hot rolling line equipped with cooling equipment under the conditions shown in Test Number 1 to 34 of Table 2 into steel bars having a diameter of 34 mm Specifically, each square billet was processed by a rough rolling mill line to have a diameter of 60 mm and processed by an intermediate rolling mill line to have a diameter of 50 mm, then processed by a finishing rolling mill line into a steel bar having a diameter of 34 mm, and hot rolling having a "total reduction of area (Rd)" of 96.4% was performed.

Rough rolling mill line: constituted by eight rolling mills,
Intermediate rolling mill line: constituted by four rolling mills,
Finishing rolling mill line: constituted by four rolling mills,
Cooling zone: installed between the eighth rolling mill of the rough rolling mill line and the first rolling mill of the intermediate rolling mill line, and between the fourth rolling mill of the intermediate rolling mill line and the first rolling mill of the fishing rolling mill line.

It should be noted that the surface temperature of the rolling material during rolling and the surface temperature of the rolling material in a cooling step performed after the completely continuous hot rolling ended were measured using a radiation thermometer, and a time $\Delta t'$ starting after a cooling step that was performed intermediately to when the subsequent rolling step was started was measured.

After the completely continuous hot rolling ended, that is, after rolling that was performed by the fourth rolling mill of the finishing rolling mill line was stopped, a cooling speed was controlled by allowing the steel bars to be cooled in the air or by changing a cooling medium, such as wind cooling, so that the steel bars were finally cooled to 500° C. It should be noted that the subsequent cooling was performed in the air.

In Table 2, the rough rolling mill line, the intermediate rolling mill line, and the finishing rolling mill line are respectively expressed as "rough line", "intermediate line", and "finishing line".

It should be noted that "entering temperatures" and "exiting temperatures" of the rough line, intermediate line, and finishing line columns shown in Table 2 respectively indicate the surface temperatures of the rolling material immediately before the rolling material entered the rough line, intermediate line, and finishing line, and the surface temperature immediately after the rolling material exited therefrom, the temperature being measured using a radiation thermometer, and the cooling speed after rolling to 500° C. being obtained with the above-described surface temperature of the rolling material that were measured using the radiation thermometer and the cooling time to 500° C. that was required.

It should be noted that, with regard to Test Numbers 1 to 34, the time $\Delta t'$ starting after the cooling step that was performed intermediately to when the subsequent rolling step was started was 8 seconds or less in all cases.

TABLE 2

| | | heating | rough line | | | intermediate line | | | finishing line | | |
|---|---|---|---|---|---|---|---|---|---|---|---|
| test no. | steel | temp. [T] (° C.) | entering temp. (° C.) | exiting temp. (° C.) | reduction of area (%) | entering temp. (° C.) | exiting temp. (° C.) | reduction of area (%) | entering temp. (° C.) | exiting temp. (° C.) | reduction of area (%) |
| 1 | A | 860 | 800 | 820 | 89.0 | 705 | 715 | 30.6 | 580 | 625 | 53.8 |
| 2 | B | 800 | 760 | 780 | 89.0 | 675 | 705 | 30.6 | 605 | 635 | 53.8 |
| 3 | C | 775 | 740 | 755 | 89.0 | 680 | 695 | 30.6 | 580 | 625 | 53.8 |
| 4 | D | 780 | 750 | 755 | 89.0 | 665 | 695 | 30.6 | 585 | 620 | 53.8 |
| 5 | E | 780 | 750 | 765 | 89.0 | 655 | 680 | 30.6 | 595 | 625 | 53.8 |
| 6 | F | 710 | 680 | 680 | 89.0 | 610 | 640 | 30.6 | 570 | 610 | 53.8 |
| 7 | G | 740 | 715 | 735 | 89.0 | 695 | 725 | 30.6 | 605 | 640 | 53.8 |
| 8 | H | 810 | 775 | 795 | 89.0 | 690 | 715 | 30.6 | 610 | 645 | 53.8 |
| 9 | I | 720 | 695 | 705 | 89.0 | 680 | 700 | 30.6 | 590 | 625 | 53.8 |
| 10 | J | 780 | 730 | 735 | 89.0 | 670 | 685 | 30.6 | 595 | 620 | 53.8 |
| 11 | K | 740 | 700 | 720 | 89.0 | 680 | 690 | 30.6 | 580 | 615 | 53.8 |
| 12 | L | 780 | 745 | 760 | 89.0 | 670 | 700 | 30.6 | 605 | 640 | 53.8 |
| 13 | M | 730 | 695 | 700 | 89.0 | 620 | 645 | 30.6 | 565 | 595 | 53.8 |
| 14 | N | 740 | 705 | 735 | 89.0 | 680 | 695 | 30.6 | 595 | 635 | 53.8 |
| 15 | O | 780 | 740 | 745 | 89.0 | 695 | 715 | 30.6 | 605 | 645 | 53.8 |
| 16 | P | 710 | 675 | 685 | 89.0 | 630 | 645 | 30.6 | 600 | 635 | 53.8 |
| 17 | Q | 760 | 725 | 735 | 89.0 | 675 | 695 | 30.6 | 590 | 630 | 53.8 |
| 18 | *R | 740 | 705 | 725 | 89.0 | 660 | 690 | 30.6 | 600 | 625 | 53.8 |
| 19 | *S | 725 | 680 | 695 | 89.0 | 620 | 640 | 30.6 | 570 | 615 | 53.8 |
| 20 | *T | 785 | 750 | 750 | 89.0 | 670 | 695 | 30.6 | 600 | 640 | 53.8 |
| 21 | *U | 795 | 745 | 740 | 89.0 | 660 | 690 | 30.6 | 595 | 635 | 53.8 |
| 22 | *V | 870 | 835 | 850 | 89.0 | 730 | 745 | 30.6 | 640 | 645 | 53.8 |
| 23 | *W | 875 | 825 | 830 | 89.0 | 720 | 725 | 30.6 | 630 | 635 | 53.8 |
| 24 | *X | 865 | 820 | 835 | 89.0 | 710 | 720 | 30.6 | 640 | 645 | 53.8 |
| 25 | *Y | 860 | 820 | 825 | 89.0 | 700 | 715 | 30.6 | 620 | 645 | 53.8 |
| 26 | *Z | 865 | 830 | 835 | 89.0 | 725 | 735 | 30.6 | 625 | 640 | 53.8 |
| 27 | B | 920 | 890 | 910 | 89.0 | 770 | 785 | 30.6 | 625 | 645 | 53.8 |
| 28 | B | 865 | 835 | 845 | 89.0 | 835 | 855 | 30.6 | 760 | 775 | 53.8 |
| 29 | B | 670 | 635 | 645 | 89.0 | 625 | 635 | 30.6 | 575 | 635 | 53.8 |
| 30 | B | 870 | 830 | 850 | 89.0 | 775 | 780 | 30.6 | 680 | 695 | 53.8 |
| 31 | B | 810 | 765 | 780 | 89.0 | 610 | 630 | 30.6 | 620 | 625 | 53.8 |
| 32 | K | 870 | 865 | 875 | 89.0 | 815 | 825 | 30.6 | 710 | 735 | 53.8 |
| 33 | M | 665 | 635 | 645 | 89.0 | 625 | 640 | 30.6 | 575 | 595 | 53.8 |
| 34 | P | 710 | 665 | 685 | 89.0 | 630 | 640 | 30.6 | 655 | 675 | 53.8 |

| test no. | cumulative reduction of area from 650 to 820° C. (%) | cumulative reduction of area from 500° C. or more to less than 650° C. (%) | total reduction of area [Rd] (%) | finishing speed [v] (m/s) | fn (1) | speed of cooling to 500° C. (° C./s) |
|---|---|---|---|---|---|---|
| 1 | 92.3 | 53.8 | 96.4 | 2.9 | 1.4 | 25 |
| 2 | 92.3 | 53.8 | 96.4 | 3.2 | 1.1 | 20 |
| 3 | 92.3 | 53.8 | 96.4 | 3.0 | 0.6 | 30 |
| 4 | 92.3 | 53.8 | 96.4 | 2.9 | 0.6 | 25 |
| 5 | 92.3 | 53.8 | 96.4 | 2.7 | 0.4 | 30 |
| 6 | 89.0 | 67.9 | 96.4 | 3.1 | 0.1 | 25 |
| 7 | 92.3 | 53.8 | 96.4 | 3.4 | 0.7 | 25 |
| 8 | 92.3 | 53.8 | 96.4 | 3.5 | 1.5 | 30 |
| 9 | 92.3 | 53.8 | 96.4 | 3.0 | 0.1 | 20 |
| 10 | 92.3 | 53.8 | 96.4 | 2.8 | 0.5 | 20 |
| 11 | 92.3 | 53.8 | 96.4 | 2.7 | 0.0 | 25 |
| 12 | 92.3 | 53.8 | 96.4 | 3.5 | 1.2 | 30 |
| 13 | 89.0 | 67.9 | 96.4 | 3.3 | 0.5 | 25 |
| 14 | 92.3 | 53.8 | 96.4 | 3.0 | 0.3 | 20 |
| 15 | 92.3 | 53.8 | 96.4 | 2.9 | 0.6 | 35 |
| 16 | 89.0 | 67.9 | 96.4 | 3.5 | 0.5 | 20 |
| 17 | 92.3 | 53.8 | 96.4 | 2.9 | 0.4 | 25 |
| 18 | 92.3 | 53.8 | 96.4 | 3.0 | 0.3 | 20 |
| 19 | 89.0 | 67.9 | 96.4 | 3.2 | 0.3 | 30 |
| 20 | 92.3 | 53.8 | 96.4 | 3.4 | 1.1 | 25 |

TABLE 2-continued

| | | | | | | |
|---|---|---|---|---|---|---|
| 21 | 92.3 | 53.8 | 96.4 | 2.8 | 0.6 | 20 |
| 22 | 30.6 | 53.8 | 96.4 | 3.0 | 1.6 | 30 |
| 23 | 30.6 | 53.8 | 96.4 | 3.6 | 2.2 | 25 |
| 24 | 30.6 | 53.8 | 96.4 | 3.2 | 1.7 | 25 |
| 25 | 30.6 | 53.8 | 96.4 | 3.5 | 2.0 | 35 |
| 26 | 30.6 | 53.8 | 96.4 | 3.1 | 1.6 | 20 |
| 27 | 30.6 | 53.8 | 96.4 | 5.0 | 4.0 | 30 |
| 28 | 53.8 | 0.0 | 96.4 | 2.7 | 1.3 | 25 |
| 29 | 0.0 | 96.4 | 96.4 | 1.8 | −1.6 | 25 |
| 30 | 67.9 | 0.0 | 96.4 | 2.6 | 1.2 | 30 |
| 31 | 89.0 | 67.9 | 96.4 | 0.7 | −1.2 | 25 |
| 32 | 67.9 | 0.0 | 96.4 | 2.9 | 1.5 | 35 |
| 33 | 0.0 | 96.4 | 96.4 | 2.2 | −1.2 | 20 |
| 34 | 93.1 | 30.6 | 96.4 | 3.6 | 0.6 | 30 |

$fn(1) = v \cdot Rd/100 - (1000 - T)/100$
*mark indicates steel that does not satisfy chemical components defined in the present invention Furthermore, with regard to each steel bar obtained in the above-described manner, the microstructure, tensile properties, impact properties, and machinability were studied with the method described below.

A test piece having a length of 20 mm was cut out from each steel bar having a diameter of 34 mm, was embedded in a resin such that the cross-section perpendicular to the rolling direction of this test piece and the cross-section that passes through the centerline and is parallel to the rolling direction respectively served as the testing surfaces, and was mirror-polished.

A nitric acid and alcohol solution (nital liquid, 3%) was first used to corrode the cross-section perpendicular to the rolling direction so that the microstructure appeared, and the microstructure was observed with a scanning electron microscope (referred to as "SEM" hereinafter) to identify phases and study the average particle diameter of ferrite and the area percentage of lamellar pearlite.

Specifically, with regard to the microstructure in a region extending from the surface to a position located a distance of ½ the radius therefrom, microstructures at three locations in total, namely, at a position located 1 mm from the surface, a position located 4.25 mm from the surface (R/4 position), and a position located 8.5 mm from the surface (R/2 position), were observed with the SEM at a magnification of 2000×, in 12 fields of view in total, that is, in 4 fields of view in 90-degree increments in the circumferential direction at each location, to identify phases constituting the microstructure, and the average particle diameter of ferrite and the area percentage of lamellar pearlite were obtained by image analysis software with the captured images. Similarly, with regard to a microstructure in the central portion, microstructures at two locations in total, namely, at a position located 12.75 mm from the surface (3R/4 position) and the center position, were observed by the SEM at a magnification of 2000×, in 5 fields of view in total, that is, in 4 fields of view in 90-degree increments in the circumferential direction at the 3R/4 position and 1 field of view at the center position, to identify phases constituting the microstructure, and the average particle diameter of ferrite and the area percentage of lamellar pearlite were obtained by the image analysis software with the captured images.

Next, after the sample that was corroded by the above-described nital liquid was mirror-polished again, the mirror-polished sample was corroded with a picric acid and alcohol solution (picral liquid), observed with the SEM, and the numbers of pieces of spheroidal cementite per area of 1 mm² in the region extending from the surface to the position located a distance of ½ the radius therefrom and the central portion were respectively studied. Specifically, with regard to the region extending from the surface to the position located a distance of ½ the radius therefrom, the microstructures at three locations in total, namely, at the above-described position located 1 mm from the surface, and the above-described R/4 and R/2 positions, were observed with the SEM at a magnification of 5000×, in 12 fields of view in total, that is, in 4 fields of view in 90-degree increments in the circumferential direction at each location, and a major axis L and a minor axis W of each cementite were individually measured by the image analysis software with the captured images, and then the number of pieces of cementite having a L/W of 2.0 or less, that is, the number of pieces of spheroidal cementite was counted to ultimately calculate the number of pieces of spheroidal cementite per area of 1 mm² (pieces/mm²). Similarly, with regard to the central portion, microstructures at the above-described two locations in total, namely, at the 3R/4 position and the center position, were observed with the SEM at a magnification of 5000×, in 5 fields of view in total, that is, in 4 fields of view in 90-degree increments in the circumferential direction at the 3R/4 position and 1 field of view at the center position, and the number of pieces of spheroidal cementite per area of 1 mm² was calculated by the image analysis software with the captured images.

On the other hand, with regard to the cross-section that passes through the centerline and is parallel to the rolling direction, mirror-polishing was performed and electropolishing was then performed, and the electropolished cross-section was observed by an electron backscatter diffraction pattern method (referred to as "EBSD" hereinafter).

Specifically, with regard to the microstructure in the region extending from the surface to the position located a distance of ½ the radius therefrom, the above-described microstructures at three locations in total, namely, at the position located 1 mm from the surface, and the R/4 position and the R/2 position, were observed by EBSD, the orientation of ferrite was measured, and image analyses were performed by using an orientation difference of 15 degrees or more as the grain boundary to obtain the average aspect ratio of ferrite.

With regard to the tensile properties, a No. 14A test piece (it should be noted that the parallel portion diameter was 4 mm) that is defined by JIS Z 2241 (2011) was collected such that the R/4 position of each steel bar having a diameter of 34 mm served as the central axis of the test piece, tensile testing was performed where the gauge length was set to 20 mm at the room temperature to obtain the tensile strength (MPa).

With regard to the impact properties, the above-described V notch Charpy impact test piece was collected such that the notch direction served as the surface and the R/4 position of each steel bar having a diameter of 34 mm matched the notch bottom position, as schematically shown in FIG. 1, and the Charpy impact test was performed at 25° C. to obtain the impact value (J/cm$^2$).

With regard to the machinability, each steel bar having a diameter of 34 mm was cut to have a length of 170 mm, and torque that was generated when deep hole drilling was performed under the following conditions up to a depth of 150 mm in the rolling direction, referenced on the center of the cross-section perpendicular to the rolling direction was measured with a gun drill having a diameter of 8.0 mm to evaluate the cutting resistance.

Rotational speed: 2300 rpm,
Feeding: 0.05 mm/rev, and
Hydraulic pressure: 5 MPa.

It should be noted that as described above, the base material toughness has a target impact value of 160 J/cm$^2$ or more. The target machinability is a torque of 300 N·cm or less, which is the index for the cutting resistance.

The results of the above-described studies are shown in Table 3. It should be noted that in Table 3, "the cross-section perpendicular to the rolling direction" and "the cross-section that passes through the centerline of the round steel material and is parallel to the rolling direction" are respectively written as "latitudinal cross-section" and "longitudinal cross-section". An "open circle" mark of the "evaluation" column of Table 3 indicates that the targets of the impact properties and the machinability are satisfied, whereas the "x" mark indicates that at least one of the above-described targets is not satisfied.

TABLE 3

| | | | microstructure in region extending from surface to position located a distance of ½ the radius therefrom | | | | microstructure in central portion | |
|---|---|---|---|---|---|---|---|---|
| | | | latitudinal cross-section | | | | | latitudinal cross-section |
| test no. | steel | phase | average particle diameter of F (μm) | area percentage of LP (%) | no. of pieces of SC (pieces/mm$^2$) | longitudinal cross-section average aspect ratio of F | phase | area percentage of LP (%) |
| 1 | A | F + LP + C | 7.5 | 4.6 | 7.5 × 10$^5$ | 4.1 | F + LP + C | 33.2 |
| 2 | B | F + LP + C | 4.1 | 6.2 | 8.0 × 10$^5$ | 4.2 | F + LP + C | 34.1 |
| 3 | C | F + LP + C | 3.9 | 5.7 | 9.0 × 10$^5$ | 4.5 | F + LP + C | 33.7 |
| 4 | D | F + LP + C | 5.2 | 4.2 | 8.0 × 10$^5$ | 4.3 | F + LP + C | 37.3 |
| 5 | E | F + LP + C | 6.5 | 6.6 | 7.5 × 10$^5$ | 4.0 | F + LP + C | 35.3 |
| 6 | F | F + LP + C | 3.1 | 5.1 | 7.5 × 10$^5$ | 5.3 | F + LP + C | 32.5 |
| 7 | G | F + LP + C | 4.7 | 3.6 | 8.0 × 10$^5$ | 4.4 | F + LP + C | 36.7 |
| 8 | H | F + LP + C | 6.2 | 5.5 | 7.5 × 10$^5$ | 5.1 | F + LP + C | 40.3 |
| 9 | I | F + LP + C | 2.8 | 5.8 | 7.0 × 10$^5$ | 4.2 | F + LP + C | 41.0 |
| 10 | J | F + LP + C | 3.6 | 6.1 | 6.5 × 10$^5$ | 4.6 | F + LP + C | 32.5 |
| 11 | K | F + LP + C | 3.5 | 7.5 | 1.0 × 10$^6$ | 4.5 | F + LP + C | 34.8 |
| 12 | L | F + LP + C | 5.8 | 9.1 | 8.0 × 10$^5$ | 4.2 | F + LP + C | 36.1 |
| 13 | M | F + LP + C | 4.5 | 5.6 | 8.5 × 10$^5$ | 5.2 | F + LP + C | 36.2 |
| 14 | N | F + LP + C | 2.8 | 11.2 | 7.5 × 10$^5$ | 4.7 | F + LP + C | 32.4 |
| 15 | O | F + LP + C | 4.5 | 4.9 | 8.0 × 10$^5$ | 4.8 | F + LP + C | 39.4 |
| 16 | P | F + LP + C | 2.1 | 13.4 | 9.5 × 10$^5$ | 5.1 | F + LP + C | 34.3 |
| 17 | Q | F + LP + C | 3.8 | 6.2 | 8.0 × 10$^5$ | 4.3 | F + LP + C | 38.7 |
| 18 | *R | F + LP + C | 5.9 | 5.2 | 7.5 × 10$^5$ | 4.1 | F + LP + C | 28.3 |
| 19 | *S | F + LP + C | 2.2 | 16.2 | 9.0 × 10$^5$ | 4.8 | F + LP + C | 47.2 |
| 20 | *T | F + LP + C | 3.1 | 18.7 | 8.5 × 10$^5$ | 4.7 | F + LP + C | 51.2 |
| 21 | *U | F + LP + C | 3.5 | 14.3 | 7.0 × 10$^5$ | 4.4 | F + LP + C | 46.3 |
| 22 | *V | F + LP + C | *11.8 | *22.1 | *2.1 × 10$^5$ | 3.8 | F + LP + C | 35.2 |
| 23 | *W | F + LP + C | *11.2 | 18.7 | *3.8 × 10$^5$ | 4.2 | F + LP + C | 39.8 |
| 24 | *X | F + LP + C | 2.9 | 6.1 | 8.5 × 10$^5$ | 4.3 | F + LP + C | 32.6 |
| 25 | *Y | F + LP + C | *12.1 | *20.2 | *2.9 × 10$^5$ | 4.4 | F + LP + C | 33.2 |
| 26 | *Z | F + LP + C | 8.1 | 12.5 | 4.5 × 10$^5$ | 4.0 | F + LP + C | 33.8 |
| 27 | B | F + LP + C | *14.1 | *32.8 | *4.0 × 10$^4$ | 3.1 | F + LP + C | 26.5 |
| 28 | B | F + LP + C | 9.3 | 14.0 | 5.8 × 10$^5$ | *1.9 | F + LP + C | 35.8 |
| 29 | B | F + LP + C | 9.2 | 16.6 | 7.0 × 10$^5$ | 5.4 | F + LP + C | *14.1 |
| 30 | B | F + LP + C | 6.8 | 7.9 | *3.3 × 10$^5$ | *1.6 | F + LP + C | 24.8 |
| 31 | B | F + LP + C | 4.6 | 4.8 | 9.0 × 10$^5$ | 4.9 | F + LP + C | *17.2 |
| 32 | K | F + LP + C | 7.7 | 8.9 | 5.9 × 10$^5$ | *1.3 | F + LP + C | 34.0 |
| 33 | M | F + LP + C | 4.2 | 15.2 | 6.0 × 10$^5$ | 5.2 | F + LP + C | *14.5 |
| 34 | P | F + LP + C | 3.4 | 5.2 | 6.3 × 10$^5$ | *2.6 | F + LP + C | 33.5 |

| test no. | microstructure in central portion latitudinal cross-section no. of pieces of SC (pieces/mm$^2$) | mechanical properties | | machinability torque generated when deep hole processing was performed with gun drill (N · cm) | evaluation |
|---|---|---|---|---|---|
| | | tensile strength (MPa) | V notch Charpy impact value (J/cm$^2$) | | |
| 1 | 7.0 × 10$^4$ | 775 | 210 | 245 | ○ |
| 2 | 1.0 × 10$^5$ | 770 | 205 | 250 | ○ |
| 3 | 8.0 × 10$^4$ | 805 | 175 | 270 | ○ |
| 4 | 3.0 × 10$^4$ | 745 | 230 | 230 | ○ |
| 5 | 6.0 × 10$^4$ | 750 | 220 | 260 | ○ |

TABLE 3-continued

| | | | | | |
|---|---|---|---|---|---|
| 6 | $5.0 \times 10^4$ | 785 | 170 | 255 | ○ |
| 7 | $5.0 \times 10^4$ | 740 | 195 | 225 | ○ |
| 8 | $9.0 \times 10^4$ | 760 | 185 | 240 | ○ |
| 9 | $4.0 \times 10^4$ | 770 | 190 | 235 | ○ |
| 10 | $5.0 \times 10^4$ | 760 | 195 | 225 | ○ |
| 11 | $9.0 \times 10^4$ | 720 | 215 | 225 | ○ |
| 12 | $1.0 \times 10^5$ | 750 | 190 | 250 | ○ |
| 13 | $1.0 \times 10^4$ | 790 | 180 | 260 | ○ |
| 14 | $6.0 \times 10^4$ | 775 | 175 | 240 | ○ |
| 15 | $4.0 \times 10^4$ | 815 | 165 | 235 | ○ |
| 16 | $5.0 \times 10^4$ | 820 | 170 | 285 | ○ |
| 17 | $2.0 \times 10^4$ | 760 | 180 | 245 | ○ |
| 18 | $1.0 \times 10^4$ | 775 | 200 | # 345 | x |
| 19 | $2.0 \times 10^4$ | 785 | 180 | # 325 | x |
| 20 | $3.0 \times 10^4$ | 790 | # 105 | 275 | x |
| 21 | $1.0 \times 10^4$ | 830 | 165 | # 340 | x |
| 22 | $1.0 \times 10^5$ | 760 | # 110 | 220 | x |
| 23 | $9.0 \times 10^4$ | 720 | # 115 | 235 | x |
| 24 | $6.0 \times 10^4$ | 740 | # 145 | 245 | x |
| 25 | $5.0 \times 10^4$ | 715 | # 110 | 255 | x |
| 26 | $7.0 \times 10^4$ | 720 | # 130 | 240 | x |
| 27 | $7.0 \times 10^4$ | 730 | # 105 | 230 | x |
| 28 | $4.0 \times 10^4$ | 750 | # 115 | 240 | x |
| 29 | *$5.1 \times 10^5$ | 745 | 170 | # 320 | x |
| 30 | $4.0 \times 10^4$ | 755 | # 110 | 260 | x |
| 31 | *$6.1 \times 10^5$ | 770 | 165 | # 335 | x |
| 32 | $2.0 \times 10^4$ | 755 | # 105 | 235 | x |
| 33 | *$5.2 \times 10^5$ | 790 | 170 | # 370 | x |
| 34 | $5.0 \times 10^4$ | 785 | # 115 | 285 | x |

"latitudinal cross-section" indicates cross-section perpendicular to rolling direction and "longitudinal cross-section" indicates cross-section that passes through centerline and is parallel to rolling direction in microstructure column. Also, "F" indicates ferrite, "LP" indicates lamellar pearlite, "C" indicates cementite, and "SC" indicates spheroidal cementite. "Central portion" indicates portion extending from center to a position located a distance of ¼ radius therefrom.
*mark indicates that conditions defined in the present invention are not satisfied.
mark indicates that target is no reached.

It is clear from Table 3 that in the case of steel bars of Test Numbers 1 to 17, which satisfy the chemical composition and the microstructure conditions defined in the present invention, the evaluations are "open circle" and these steel bars have target properties without performing thermal refining (excellent base material toughness, that is, the impact value obtained in the Charpy impact test with a V notch Charpy impact test piece at a test temperature of 25° C. is 160 J/cm² or more, and excellent machinability, that is the torque that was generated when deep hole drilling was performed with a gun drill was 300 N·cm or less).

In contrast to this, it is clear that in the case of steel bars of Test Numbers 18 to 34, which do not satisfy at least one of the chemical composition and the microstructure conditions defined in the present invention, the evaluations thereof are "x" and these steel bars do not obtain target properties and thermal refining cannot be omitted.

In other words, in the case of Test Number 18, the Si content of the used steel R was 1.25%, which was high and exceeded the value defined in the present invention. Thus, the torque that was generated when the deep hole drilling was performed with the gun drill was 345 N·cm, which was high.

In the case of Test Number 19, the Mn content of the used steel S was 2.31%, which was high and exceeded the value defined in the present invention. Thus, the torque that was generated when the deep hole drilling was performed with the gun drill was 325 N·cm, which was high.

In the case of Test Number 20, the C content of the used steel T was 0.62%, which was high and exceeded the value defined in the present invention. Thus, the V notch Charpy impact value was 105 J/cm², which was low.

In the case of Test Number 21, the Cr content of the used steel U was 2.41%, which was high and exceeded the value defined in the present invention. Thus, the torque that was generated when the deep hole drilling was performed with the gun drill was 340 N·cm, which was high.

In the case of Test Number 22, the used steel V did not contain B and did not have the chemical composition defined in the present invention, and the average particle diameter of ferrite, the area percentage of lamellar pearlite, and the number of pieces of spheroidal cementite in the region extending from the surface to the position located a distance of ½ the radius therefrom in the cross-section perpendicular to the rolling direction were respectively 11.8 µm, 22.1%, and $2.1 \times 10^5$ pieces/mm², which were out of the range defined in the present invention. Thus, the V notch Charpy impact value was 110 J/cm², which was low.

In the case of Test Number 23, the N content of the used steel W was 0.012%, which was high and exceeded the value defined in the present invention, and the average particle diameter of ferrite and the number of pieces of spheroidal cementite in the region extending from the surface to the position located a distance of ½ the radius therefrom in the cross-section perpendicular to the rolling direction were also respectively 11.2 µm and $3.8 \times 10^5$ pieces/mm², which were out of the range defined in the present invention. Thus, the V notch Charpy impact value was 115 J/cm², which was low.

In the case of Test Number 24, the Ti content of the used steel X was 0.057%, which was high and exceeded the value defined in the present invention. Thus, the V notch Charpy impact value was 145 J/cm², which was low.

In the case of Test Number 25, the Ti content of the used steel Y was less than [3.4N], which is the lower limit of Equation (1), did not satisfy the conditions defined in the present invention, and the average particle diameter of ferrite, the area percentage of lamellar pearlite, and the number of pieces of spheroidal cementite in the region extending from the surface to the position located a distance of ½ the radius therefrom in the cross-section perpendicular to the rolling direction were respectively 12.1 µm, 20.2%, and $2.9 \times 10^5$ pieces/mm$^2$, which were out of the range defined in the present invention. Thus, the V notch Charpy impact value was 110 J/cm$^2$, which was low.

In the case of Test Number 26, the Ti content of the used steel Z was higher than [3.4N+0.02], which is the upper limit of Equation (1), and did not satisfy the conditions defined in the present invention. Thus, the V notch Charpy impact value was 130 J/cm$^2$, which was low.

In the case of Test Numbers 27 to 31, although the chemical composition of the used steel B satisfied the conditions defined in the present invention, the microstructure did not satisfy the range defined in the present invention. Thus, one of the impact properties and the machinability did not reach the target.

Specifically, in the case of Test Number 27, the average particle diameter of ferrite, the area percentage of lamellar pearlite, and the number of pieces of spheroidal cementite in the region extending from the surface to the position located a distance of ½ the radius therefrom in the cross-section perpendicular to the rolling direction were respectively 14.1 µm, 32.8%, and $4.0 \times 10^4$ pieces/mm$^2$, which were out of the range defined in the present invention. Thus, the V notch Charpy impact value was 105 J/cm$^2$, which was low.

In the case of Test Number 28, the average aspect ratio of ferrite in the region extending from the surface to the position located a distance of ½ the radius therefrom in the cross-section that passes through the centerline and is parallel to the rolling direction was 1.9, which was out of the range defined in the present invention. Thus, the V notch Charpy impact value was 115 J/cm$^2$, which was low.

In the case of Test Number 29, the area percentage of lamellar pearlite in the central portion and the number of pieces of spheroidal cementite in the cross-section perpendicular to the rolling direction were respectively 14.1% and $5.1 \times 10^5$ pieces/mm$^2$, which were out of the range defined in the present invention. Thus, the torque that was generated when the deep hole drilling was performed with the gun drill was 320 N·cm, which was high.

In the case of Test Number 30, the number of pieces of spheroidal cementite in the region extending from the surface to the position located ½ the radius therefrom in the cross-section perpendicular to the rolling direction was $3.3 \times 10^5$ pieces/mm$^2$ and the average aspect ratio of ferrite in the region extending from the surface to the position located a distance of ½ the radius therefrom in the cross-section that passes through the centerline and is parallel to the rolling direction was 1.6, which are out of the range defined in the present invention. Thus, the V notch Charpy impact value was 110 J/cm$^2$, which was low.

In the case of Test Number 31, the area percentage of lamellar pearlite in the central portion and the number of pieces of spheroidal cementite in the cross-section perpendicular to the rolling direction were respectively 17.2% and $6.1 \times 10^5$ pieces/mm$^2$, which were out of the range defined in the present invention. Thus, the torque that was generated when the deep hole drilling was performed with the gun drill was 335 N·cm, which was high.

In the case of Test Numbers 32 to 34, the chemical composition of the used steels K, M, and P satisfied the conditions defined in the present invention, whereas the microstructure did not satisfy the range defined in the present invention. Thus, one or both of the impact properties and the machinability did not reach the target.

Specifically, in the case of Test Number 32, the average aspect ratio of ferrite in the region extending from the surface to the position located a distance of ½ the radius therefrom in the cross-section that passes through the centerline and is parallel to the rolling direction was 1.3, which was out of the range defined in the present invention. Thus, the V notch Charpy impact value was 105 J/cm$^2$, which was low.

In the case of Test Number 33, the area percentage of lamellar pearlite in the central portion and the number of pieces of spheroidal cementite in the cross-section perpendicular to the rolling direction were respectively 14.5% and $5.2 \times 10^5$ pieces/mm$^2$, which were out of the range defined in the present invention. Thus, the torque that was generated when the deep hole drilling was performed with the gun drill was 370 N·cm, which was high.

In the case of Test Number 34, the average aspect ratio of ferrite in the region extending from the surface to the position located a distance of ½ the radius therefrom in the cross-section that passes through the centerline and is parallel to the rolling direction was 2.6, which was out of the range defined in the present invention. Thus, the V notch Charpy impact value was 115 J/cm$^2$, which was low. It should be noted that in these test numbers, rolling was performed in the rough line and finishing line at 650 to 820° C., and the cumulative reduction of area in this case was calculated as [(reduction of area in rough line)+(100%−reduction of area immediately before entering finishing line)×reduction of area in finishing line].

Working Embodiment 2

The steel bars, having a diameter of 34 mm, of Test Number 2, Test Number 11, Test Number 13, Test Number 16, Test Number 20, Test Number 28, Test Number 32, and Test Number 34, which were obtained in Working Example 1, were used to produce test pieces imitating rack bars.

First, shot peening was performed on the steel bar having a diameter of 34 mm to remove surface scale, and then drawing processing was performed in a state in which lubricant was applied to the surface so that the steel bar was forming to have a diameter of 31 mm.

Figure 2:
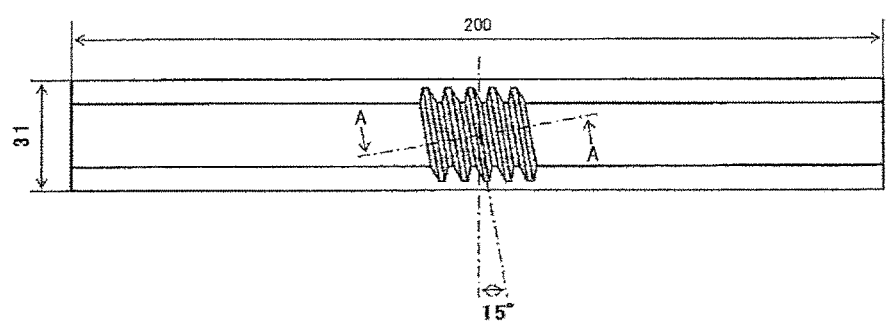
FIG. 2 is a diagram illustrating the shape of a test piece that is collected from a steel bar that has undergone drawing processing and imitates a steering rack bar used in a three-point bending test in Working Example 2.
Figure 2:
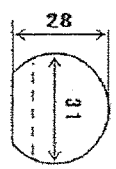
Figure 2:
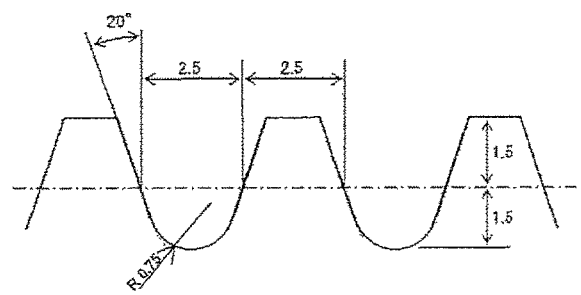

Next, the above-described drawn material was processed into a test piece imitating the steering rack bar shown in FIG. 2.

Furthermore, induction hardening was performed through adjusting various conditions of induction hardening such that the depth of a quench-hardened layer (the depth from the surface having a Vickers hardness of 450) in a gear base corresponding portion of the rack bar reached 1 mm Thereafter, in order to prevent fracture after induction hardening, tempering processing was performed for 2 hours at 180° C.

Figure 3:
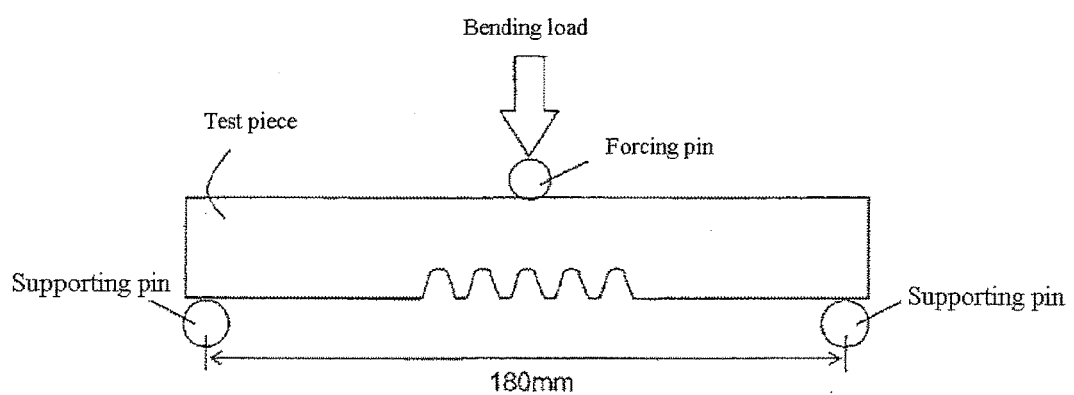
FIG. 3 is a diagram schematically illustrating a method of the three-point bending test that was performed in Working Example 2.

Next, the test piece that underwent tempering after the above-described induction hardening was used to perform a three-point bending test where the distance between supporting points was 180 mm and the forcing speed was 1.0 mm/min as shown in FIG. 3, and a "load-stroke (force distance) curve" was collected, and the maximum load, that is, the load that was used when load changed due to occurrence of a crack was given as "crack occurrence load".

Next, the test piece that underwent the three-point bending test was forcibly broken and the appearance of the broken cross-section was photographed, and with regard to all of the cross-sections, the area percentage of cracks that developed during the bending test was obtained by image analysis processing to evaluate crack development resistance. It should be noted that with regard to the damage prevention properties, the target for the area percentage of cracks that developed during the above-described bending test was 30% or less.

The results of the above-described studies are shown in Table 4. It should be noted that an "open circle" mark in the "evaluation" column of Table 4 indicates that the area percentage of cracks that developed during the bending test is 30% or less, and the target is reached, whereas "x" mark indicates that the above-described target is not reached.

TABLE 4

| test no. | steel | test no. in Work. Ex. 1 in steel bar manufacture | crack occurrence load (N) | area percentage of cracks that developed | overall evaluation |
|---|---|---|---|---|---|
| 35 | B | 2 | 65 | 25 | ○ |
| 36 | K | 11 | 60 | 25 | ○ |
| 37 | M | 13 | 60 | 25 | ○ |
| 38 | P | 16 | 60 | 20 | ○ |
| 39 | *T | *20 | 65 | # 80 | x |
| 40 | B | *28 | 55 | # 65 | x |
| 41 | K | *32 | 60 | # 70 | x |
| 42 | P | *34 | 55 | # 60 | x |

*mark indicates that conditions defined in the present invention are not satisfied.
mark indicates that target is not reached It is clear from Table 4 that in the case of Test Numbers 35 to 38, in which steel bars of Test Number 2, Test Number 11, Test Number 13, and Test Number 16 that satisfy the chemical composition and the microstructure conditions defined in the present invention were used, the evaluation was "open circle" and they had excellent properties, that is, the area percentage of cracks that developed during the three-point bending test was 30% or less, even without performing thermal refining.

In contrast to this, in the case of Test Number 39 in which the steel bar of Test Number 20 was used, as shown in Table 3, the V notch Charpy impact value was 105 J/cm$^2$, which was low, and therefore the area percentage of cracks that developed also in the three-point bending test was 80%, which was high, and Test Number 39 had low damage prevention properties.

Similarly, in the case of Test Number 40 in which the steel bar of Test Number 28 was used, as shown in Table 3, the V notch Charpy impact value was 115 J/cm$^2$, which was low, and therefore the area percentage of cracks that developed also in the three-point bending test was 65%, which was high, and Test Number 40 had low damage prevention properties.

Also, in the case of Test Number 41 in which the steel bar of Test Number 32 was used, as shown in Table 3, the V notch Charpy impact value was 105 J/cm$^2$, which was low, and therefore the area percentage of cracks that developed also in the three-point bending test was 70%, which was high, and Test Number 41 had low damage prevention properties.

Also, in the case of Test Number 42 in which the steel bar of Test Number 34 was used, as shown in Table 3, the V notch Charpy impact value was 115 J/cm$^2$, which was low, and therefore the area percentage of cracks that developed also in the three-point bending test was 60%, which was high, and Test Number 42 had low damage prevention properties.

INDUSTRIAL APPLICABILITY

It is not necessary for a rolled round steel material for a steering rack bar according to the present invention to contain high-cost V, and even if thermal refining is not performed, the rolled round steel material has good machinability for forming a deep hole in the central portion and a high base material toughness, or in other words, the impact value obtained in the Charpy impact test with a V notch Charpy impact test piece at a test temperature of 25° C. in the state of the rolled round steel material is 160 J/cm$^2$ or more, and therefore the rolled round steel material is favorably used as the raw material for a steering rack bar.

In addition, the steering rack bar of the present invention can be obtained by using the above-described rolled round steel material for a steering rack bar without thermal refining.

The invention claimed is:

1. A rolled round steel material for a steering rack bar, comprising: in mass %,
   C in an amount of 0.38 to 0.55%;
   Si in an amount of 1.0% or less;
   Mn in an amount of 0.20 to 2.0%;
   S in an amount of 0.005 to 0.10%;
   Cr in an amount of 0.01 to 2.0%;
   Al in an amount of 0.003 to 0.10%;
   B in an amount of 0.0005 to 0.0030%;
   Ti in an amount of 0.047% or less;
   Cu in an amount of 0 to 1.0%;
   Ni in an amount of 0 to 3.0%;
   Mo in an amount of 0 to 0.50%;
   Nb in an amount of 0 to 0.10%;
   V in an amount of 0 to 0.30%;
   Ca in an amount of 0 to 0.005%, and
   Pb in an amount of 0 to 0.30%,
   a remaining portion being constituted by Fe and impurities,
   the impurities containing P in an amount of 0.030% or less and N in an amount of 0.008% or less, and
   the rolled round steel material having a chemical composition satisfying Equation (1) below, $$3.4N \leq Ti \leq 3.4N + 0.02 \quad (1)$$

where a symbol of an element indicates a content of the element in mass %,
   wherein a microstructure is constituted by ferrite, lamellar pearlite, and cementite,
   in a cross-section perpendicular to a rolling direction, in a region extending from a surface to a position located a distance of ½ the radius therefrom, an average particle diameter of the ferrite is 10 μm or less, an area percentage of the lamellar pearlite is less than 20%, a number of pieces of spheroidal cementite of the cementite is 4×10$^5$ pieces/mm$^2$ or more, and, in a central portion, an area percentage of the lamellar pearlite is 20% or more and a number of pieces of spheroidal cementite of the cementite is less than 4×10$^5$ pieces/mm$^2$, and
   in a cross-section that passes through a centerline of the round steel material and is parallel to the rolling direction, an average aspect ratio of the ferrite in a region extending from a surface to a position located a distance of ½ the radius therefrom is 3 or more.

2. The rolled round steel material for a steering rack bar according to claim 1, comprising, in mass %, at least one selected from Cu in an amount of 0.05 to 1.0%, Ni in an amount of 0.05 to 3.0%, and Mo in an amount of 0.05 to 0.50%.

3. The rolled round steel material for a steering rack bar according to claim 1, comprising, in mass %, at least one selected from Nb in an amount of 0.010 to 0.10% and V in an amount of 0.01 to 0.30%.

4. The rolled round steel material for a steering rack bar according to claim 1, comprising, in mass %, at least one selected from Ca in an amount of 0.0005 to 0.005% and Pb in an amount of 0.05 to 0.30%.

5. A steering rack bar in which the rolled round steel material for a steering rack bar according to claim 1 is used without thermal refining.

6. A steering rack bar in which the rolled round steel material for a steering rack bar according to claim 2 is used without thermal refining.

7. A steering rack bar in which the rolled round steel material for a steering rack bar according to claim 3 is used without thermal refining.

8. A steering rack bar in which the rolled round steel material for a steering rack bar according to claim 4 is used without thermal refining.

* * * * *